United States Patent [19]

VanBuskirk et al.

[11] Patent Number: 5,357,030

[45] Date of Patent: Oct. 18, 1994

[54] PROCESS FOR PRODUCING AND POLYAMIDE COMPOSITIONS COMPRISING LACTAMYL PHOSPHITES AS CHAIN EXTENDING AGENTS

[75] Inventors: Bruce VanBuskirk, Dover; Murali K. Akkapeddi; Jeffrey H. Glans, both of Morristown, all of N.J.

[73] Assignee: AlliedSignal Inc., Morris Township, Morris County, N.J.

[21] Appl. No.: 892,844

[22] Filed: Jun. 3, 1992

[51] Int. Cl.$^5$ ............... C08G 69/42; C08G 69/48; C08K 5/49

[52] U.S. Cl. ............... 528/337; 522/139; 522/164; 524/115; 524/128; 524/148; 525/375; 525/420

[58] Field of Search .............. 528/337; 522/140, 164, 522/139; 524/115, 128, 122, 148; 525/420, 375

[56] References Cited

U.S. PATENT DOCUMENTS

| | | | |
|---|---|---|---|
| 3,551,548 | 12/1970 | Brignac et al. | 528/339 |
| 3,763,113 | 10/1973 | Burrows et al. | 524/123 |
| 4,433,116 | 2/1984 | Largman et al. | 525/420 |
| 5,116,919 | 5/1992 | Buzinkai et al. | 525/420 |
| 5,118,805 | 6/1992 | Glans et al. | 540/451 |
| 5,142,000 | 8/1992 | Wheland | 525/420 |

FOREIGN PATENT DOCUMENTS

| | | |
|---|---|---|
| 0232878 | 9/1987 | European Pat. Off. . |
| 0232879 | 9/1987 | European Pat. Off. . |
| 9292579 | 2/1992 | PCT Int'l Appl. . |

OTHER PUBLICATIONS

R. Mateva, Journel of Polymer Science, Part A-Polymer Chemistry 30 1449 (1992).

Soviet Inventions Illustrated, Section Ch: Chemical, week 8423, 18 Jul. 1994.

Journal Of Applied Polymer Science, vol. 34, No. 8, Dec. 1987, pp. 2769–2776.

Journal Of Applied Polymer Science, vol. 30, No. 8, Aug. 1985, pp. 3325–3337.

Chemical Abstracts, vol. 76, No. 6, 7 Feb. 1972, p. 16, col 1., 25774n.

Chemical Abstracts, vol. 75, No. 2, 12 Jul. 1971, p. 64, col 1., 7271w.

Primary Examiner—Paul R. Michl
Assistant Examiner—Tae H. Yoon
Attorney, Agent, or Firm—Melanie L. Brown; Roger H. Criss

[57] ABSTRACT

The invention relates to a process for producing chain extended polyamide compositions which comprise one or more polyamides and one or more lactamyl phosphites.

15 Claims, No Drawings

PROCESS FOR PRODUCING AND POLYAMIDE COMPOSITIONS COMPRISING LACTAMYL PHOSPHITES AS CHAIN EXTENDING AGENTS

BACKGROUND

1. Field of the Invention The present invention relates to polyamide compositions, more particularly to compositions and processes which are related to chain extended polyamide compositions.

2. Description of the Prior Art

Polyamide compositions find widespread use due to one or more desirable properties, i.e., toughness, rigidity, chemical resistance, and the like. However, the use of various types of polyamides is sometimes limited due to inadequacies in molecular weight and/or molecular weight distribution. For example, low molecular weight polyamides are unsuitable for use in blow molding operations which require that the composition have a high melt viscosity so to allow blow molding of the parison into an article. To overcome such shortcomings, it is known to the art that the use of a plurality of additives, in particular various reactive compositions may be used in conjunction with the one or more polyamides of a composition in order to increase the molecular weight thereof.

EP Published Application 0 232 878 teaches polyamide compositions which include a polyamide composition and a reaction product of ethylene and a polymerizable carboxylic acid group containing compound, and optional copolymerizable monomer.

EP Published Application 0 232 879 teaches polyamide compositions which contain in addition to the polyamide an ethylene copolymer, a copolymer product of a vinyl aromatic monomer and a polymerizable carboxylic acid containing monomer and a homopolymer or copolymer containing a conjugated diene.

As may be seen from the prior art, and the activity therein, there remains a need for continued development, and further improved compositions comprising polyamides which may be produced to have desired molecular weight characteristics to make them suitable for use in a variety of production processes, particularly in extrusion and blow molding techniques. It is to this need, as well as other needs, that the present invention is addressed.

SUMMARY

In one aspect of the invention, there is provided polyamide compositions of intermediate and high molecular weights which are attained by reacting with at least one lower molecular weight polyamide with an effective amount of a lactamyl phosphite, especially phosphoroustrislactam, as a constituent. The reaction may be carried out by blending these constituents and any other optional constituents in a melt. The lactamyl phosphite acts as chain extender to the polyamides, and thereby providing materials which exhibit improved physical characteristics than those provided in the art.

Further aspects of the invention not particularly recited here will become apparent upon a reading of the accompanying specification of the preferred embodiments and the claims below.

DESCRIPTION OF THE PREFERRED EMBODIMENTS

The compositions according to the inventive teaching include the reaction product of one or more polyamides, with at least one lactamyl phoshite, and optional conventional additives. Polyamides suitable for use include the long chain polymeric amides having recurring amide groups as part of the polymer backbone and preferably, have a number average molecular weight as measured by end group titration of about 15,000 to 40,000. The polyamides suitable for use herein can be produced by any conventional means known to the art.

Polyamides which find use in accordance with the present invention include those which may be obtained by the polymerization of equimolar proportions of a diamine having two or more carbon atoms between the amine terminal groups with a dicarboxylic acid, or alternately that obtained by the polymerization of a monoamino carboxylic acid or an internal lactam thereof with an equimolar proportion of a diamine and a dicarboxylic acid.

Further, suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation are well described under the heading "Polyamides" in the Encyclopedia of Polymer Science and Technology, published by John Wiley & Sons, Inc., Vol. 10, pps. 487–491, (1969).

Suitable diamines include those having the formula

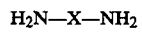

wherein n has an integer value of 1–16 and X is $(CH_2)_n$, or may further be such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds. The dicarboxylic acids useful in the formation of polyamides are preferably those which are represented by the general formula

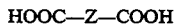

wherein Z is representative of a divalent aliphatic radical containing at least 2 carbon atoms, such as adipic acid, sebacic acid, octadecanedioic acid, pimelic acid, subeic acid, azelaic acid, undecanedioic acid, and glutaric acid. The dicarboxylic acids may be aliphatic acids, or aromatic acids, such as isophthalic acid and terephthalic acid.

By means of example, suitable polyamides include: polyprrolidone (nylon 4), polycaprolactam (nylon 6), polyheptolactam (nylon 7), polycaprylactam (nylon 8), polynonanolactam (nylon 9), polyundecaneolactam (nylon 11), polydodecanolactam (nylon 12), poly(tetramethylenedioxamide) (nylon 4,2), poly(tetramethyleneadipamide) (nylon 4,6), poly(tetramethylenediamine-co-isophthalic acid) (nylon 4,I), *polyhexamethylene adipamide (nylon 6,6),* polyhexamethylene azelaiamide (nylon 6,9), polyhexamethylene sebacamide (nylon 6,10), polyhexamethylene isophthalamide (nylon 6,IP), polymetaxylylene adipamide (nylon MXD,6), the polyamide of n-dodecanedioic acid and hexamethylenediamine (nylon 6,12), the polyamide of dodecamethylenediamine and n-dodecanedioic acid (nylon 12,12), as well as copolymers thereof which include: hexamethylene adipamide-caprolactam (nylon 6,6/6), hexamethylene adipamide/hexamethylene-isophthalamide (nylon 6,6/6IP), hexamethylene adipamide/hexamethylene-terephthalamide (nylon 6,6/6T), trimethylene adipamide-hexamethylene-azelaiamide (nylon trimethyl,6/6), and hexamethylene adipamide-hexamethylene-azelaiamide caprolactam (nylon 6,6/6,9/6) as well as others which are not particularly delineated here.

The polyamides may contain various terminal functionalities of which the most preferred are terminal functionalities which include both amino functional groups as one terminal functional group and a carboxyl group as another functional group; these may be present in various relative proportions such as where the amount of carboxyl groups predominates over the amino functional groups. Preferred are those which are termed as "balanced", having an approximately equal proportion of amino functional groups to carboxyl functional groups. The polyamides may be of any desired molecular weight or molecular weight distribution.

The compositions according to the instant invention further include at least one lactamyl phosphite which may be generally represented by the following formula [1]:

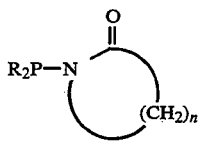

or alternately in accordance with formula [2]

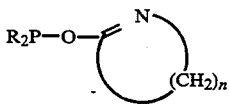

wherein the substituent group "R" may be any organic moiety such as an ethoxy, alkoxy, aryloxy, aryl or alkyl group. Such lactamyl phosphites, especially wherein the substituent R is an ethoxy group is particularly described in an article by R. Mateva and N. Dencheva in the Journal of Polymer Science, Part A-Polymer Chemistry 30 1449 (1992). Further useful and preferred lactamyl phosphites are phosphoroustrislactams (sometimes hereinafter referred to as "TCP") which find use in the present invention. These phosphoroustrislactams are particularly described in U.S. Pat. 5,118,805 for "PHOSPHOROUSTRISLACTAMS AND METHODS FOR THEIR PRODUCTION", and assigned to the same assignee as the instant application, the complete contents of which are herein incorporated by reference. The phosphoroustrislactams may be described as compounds in accordance with formula [3], below

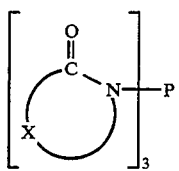

or alternately, in accordance with formula [4],

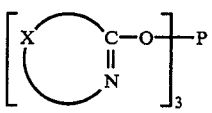

where X represents a chain of $CH_2$ monomer repeat units of at least 1 and including up to 11 $CH_2$ monomer repeat units.

The phosphoroustrislactams may be produced for example by the reaction of a phosphoroustrihalide and a lactam, preferably caprolactam by the dropwise addition of the phosphoroustrihalide to the lactam in an aprotic organic solvent such as tetrahydrofuran, dioxane or glyme, and subsequently washed such as with water. The phosphoroustrislactams and their method of production is described more fully in commonly assigned U.S. Pat. 5,118,805 the contents of which are herein incorporated by reference.

The lactamyl phosphites, especially the phosphoroustrislactams utilized as a chain extending agent induce what is believed to be a coupling reaction between the amine end group of the one polyamide molecule with the carboxyl end group of a further polyamide molecule which results in a higher molecular weight polymer. Under ideal circumstances, equimolar amounts of amine terminal groups of a polyamide is reacted with the carboxyl terminal group of a further polyamide in the presence of a phosphoroustrislactam. The coupling reaction liberates as byproducts equimolar amounts of a caprolactam and phosphorous acid derivatives. Due to the relatively inert nature of these byproducts, the reacted polyamide compositions and the remaining caprolactam and phosphorous acid derivatives may be removed by conventional methods. One beneficial feature of this reaction is that none of the byproducts of the coupling reaction are phenol comprising compounds, which are presently known to have toxic characteristics, which benefit is in contrast to the use of a tri(phenyl phosphite) which forms phenol comprising compounds as a by-products of its reaction.

What is to be understood by the term "effective amount" relative to the lactamyl phosphite is that an amount which is effective in providing sufficient coupling reactions between the terminal groups of the one or more polyamides and with the lactamyl phosphite which results in a chain extended polyamide having a desired ultimate molecular weight. Such effective amounts may be readily determined experimentally and are to be understood to vary relative to the polyamide or polyamides used and the ultimate molecular weight to be produced. Generally, the required amount of lactamyl phosphite is expected to be less than 10 parts by weight ("pbw") relative to 100 pbw of the polyamide or polyamides used; preferably even less. Examplary compositions are more particularly detailed in the Examples described below.

Other optional constituents which may be incorporated into the blends according to the instant invention include such materials as fillers such as glass fibers or mineral fibers, impact modifiers, dyes, colorants, pigments, plasticizers, mold release agents, fire retardants, drip retardants, antioxidants, UV stabilizing agents, mold release agents, colorants, antistatic agents, nucleating agents, thermal stabilizing agents, and the like. These optional constituents may be added to the mixture at any appropriate time during the production of the blend, and as they are well known to the art, are not here described with particularity. All of these optional constituents are commercially available.

The compositions according to the instant invention may be made by any technique or process, presently known or yet to be developed which will effect an intimate blending of the constituents of the compositions, particularly the polyamide, lactamyl phosphite, particularly TCP, and any additional constituents. By way of example, such useful methods include formation of a solution in which the constituents are dissolved, suspended or dispersed in a suitable solvent, after which the solvent is removed from the resultant blend composition by conventional processes in order to form compositions in accordance with the teachings of the instant invention. An alternative technique is by the dry-blending the constituents in a dry particulate form, such as powders, pellets, flakes, prills or the like, and then heated to a temperature equal to or greater than the melting point of the highest melting constituent. A further variation on this technique which may be utilized where all of the desired constituents are not available in powder form, is an additional process steps of mixing any liquid constituents or constituents in liquid form subsequent to dry blending of the constituents, and thoroughly mixing the constituents, as well as removal of excess liquids during processing by well known techniques.

The polyamide or polyamides may be reacted with the phosphoroustrisiactam in any manner which is effective for the chain coupling reaction to occur. Such methods require only that the lactamyl phosphite and the polyamide be well mixed and be at a sufficient temperature to allow for the coupling to occur. Exemplary techniques include batchwise fashions, or alternatively in continuous fashions. In the case of the former, a reaction vessel suitable to contain the constituents and to provide suitable reaction conditions, e.g. heat, temperature, adequate mixing of the constituents, atmosphere may be used, and such vessels include common laboratory glassware and flasks, Banbury mixers, and the like. In the case of the latter, an extruder of the single or multiple screw variety having at least one reaction zone may be utilized, as well as extruders having multiple zones, both in a series arrangement or in a parallel arrangement.

During production of compositions according to the instant invention, it is recognized that acceptable temperatures used in heating the constituents may vary over a wide range, and is dependent upon the constitution of the any particular blend composition. Preferably, the temperature should be at least as high as the melting point of the polyamide but at the same time, should not be as high as the degradation temperatures of the polyamide. In particularly preferred embodiments, the temperature is such that the polyamide will be retained in a molten state sufficiently long to allow for the phosphoroustrislactam to react with the polyamide and form a higher molecular weight polymer therewith.

The heating of the constituents may be carried out in any manner whereby the temperature constraints outlined above are achieved. In one contemplated method, the heating step is carried out at a temperature which is equal to or greater than the melting point of the desired resultant composition. In an alternative method, the constituents are heated so that the temperature is increased as a function of time over the course of any heating process to cause the melting of constituents in the manner described in this specification, and to maintain this mixture in a molten state. Other methods not particularly described here, but which may be utilized in forming compositions according to the present invention are contemplated and considered within the scope of the invention.

Pressures are not contemplated to have any critical effect, and can be widely varied without adversely effecting the process of forming the inventive compositions. consequently, heating can be conducted at pressures below, at, or above atmospheric pressure. In preferred embodiments, at least a portion of the heating step is carried out at a reduced pressure so to allow the removal of any volatile constituents or by-products.

The production of compositions may be conducted under normal atmospheric conditions, or in the absence of air. Alternately, the production of compositions may be conducted in a controlled atmosphere, such as in the presence of carbon dioxide, as well as an inert gas, such as argon, nitrogen, or other inert gas.

The time needed to react the constituents may vary over a wide range, and is recognized to be a factor of such effects as the polyamide selected, additional constituents selected, the concentration of each of the constituents forming the composition, the temperatures to be used as well as the type of heating step used, as well as the type of reaction vessel and the manner of forming the composition. These are factors which are known in the art as effecting reaction times. In most instances, the reaction time will vary between from about 5 seconds up to about 25 hours, preferably, the reaction times vary between about 30 seconds to about 1 hour.

While not wishing to be bound by any theory, it is believed that the use of the lactamyl phosphites effects chain extension of the one or more polyamides and that by control of the process conditions of the chain extension reaction, a wide range of molecular weights may be attained. It is further contemplated that when two or more dissimilar polyamides are reacted with one or more lactamyl phosphites, a compatible polyamide blend is attained.

Preferably, the process of forming compositions in accordance with the instant invention includes a process step of removing any by-products of the reaction. The methods used may be any conventional means which does not adversely effect the composition formed. In preferred embodiments, all or part of the by-products are removed as it is believed that such removal enhances the effectiveness of the grafting process and improves the mechanical and other properties of the blend. Ideally, a composition where all of the by-products are removed forms the most preferred embodiment of the invention, however it is concurrently recognized that complete removal is not always possible. Preferably, such techniques include formation of the blend under vacuum conditions or under reduced pressures, during any heating step.

The compositions of the instant invention are suitable for the formation of articles by subsequent molding or forming techniques, including but not limited to blow molding, thermoforming of articles such as by compression, injection, extrusion, as well as other techniques not particularly recited here, but which are nonetheless useful in forming formed articles therefrom. Particularly, the controllable molecular weights of the chain extended polyamide compositions taught herein include blow molding operations, injection molding techniques and in extrusion production techniques.

The compositions of the instant invention are useful in all applications wherein polyamides may be used; however, one distinguishing feature of the compositions of the present invention is that in their formation no phenols or phenolic compounds are formed or released.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

For each of the following examples the following materials were utilized. "Nylon 1" was a low to intermediate molecular weight Nylon 6 homopolymer resin which may be characterized as having a formic acid viscosity ("FAV") of 56 at 25 deg. C. and about 9.5% extractables. "Nylon 2" was a commercially available grade of nylon 6 molding resin marketed by Allied-Signal Inc. as Capron (R) 8209F which may be characterized as a high viscosity Nylon 6 film grade resin having a specific gravity of 1.13 according to ASTM D-792, a melting point of 420 deg. F. "Nylon 3" was a commercially available grade of Nylon 6 homopolymer molding resin marketed by Allied-Signal Inc. as Capron (R) 8207F and sold as a film grade resin which may be characterized as a medium viscosity homopolymer Nylon 6 having a specific gravity of 1.13 and a melting point of 420 deg. F. according to ASTM D-792. "TCP" was phosphoroustrislactam produced in accordance with U.S. Pat. 5,118,805.

Each of the compositions were produced in accordance with the following general technique. Weighted amounts of the constituents were tumble blended together in a sealed container to assure a homogeneous blend, after which each of the mixtures were supplied to the feed hopper placed at the throat of a Haake-Buechler Instrument Co. model TW-100 twin screw vented extruder having two counter-rotating conical intermeshing mixing screws. The extruder barrel had the temperature profiles and operating conditions noted on Table 1 below.

TABLE 1

| Composition: | A | B | C | D | 1 | 2 | 3 |
| --- | --- | --- | --- | --- | --- | --- | --- |
| Nylon 1: | 100 | | | 100 | | | |
| Nylon 2: | | 100 | | | | | |
| Nylon 3: | | | 100 | | 99 | 98 | 97 |
| phosphoroustrislactam: | — | — | — | — | 1 | 2 | 3 |
| Extruder Temp. in deg. C. | | | | | | | |
| zone 1: | 240 | 244 | 239 | 200–211 | 242 | 239 | 241 |
| zone 2: | 258 | 259 | 258 | 230–233 | 259 | 262 | 262 |
| zone 3: | 275 | 272 | 269 | 250–266 | 268 | 267 | 271 |
| zone 4: | 280 | 280 | 280 | 250 | 280 | 280 | 280 |
| die: | 275 | 270 | 269 | 250–272 | 270 | 273 | 275 |
| speed, rpm: | 8787 | 87 | 87 | 50 | 87 | 87 | 87 |
| pressure, psi: | 0–200 | 75–130 | 40–170 | 60 | 500–900 | 1200–2100 | 2200–2500 |
| torque, m-gm: | 100–1500 | 2700–3500 | 220–2800 | 600 | 2800–4100 | 3800–4850 | 4700–5700 |

| Composition: | 4 | 5 | 6 | 7 | 8 | 9 | 10 | 11 |
| --- | --- | --- | --- | --- | --- | --- | --- | --- |
| Nylon 1: | | | | 99 | 96 | 97 | 99 | 99 |
| Nylon 2: | 99 | 98 | 97 | | | | | |
| Nylon 3: | | | | | | | | |
| phosphoroustrislactam: | 1 | 2 | 3 | 1 | 2 | 3 | 1 | 1 |
| Extruder Temp. in deg. C. | | | | | | | | |
| zone 1: | 247 | 247 | 245 | 241 | 243 | 243 | 200–210 | 200–211 |
| zone 2: | 264 | 262 | 259 | 262 | 264 | 264 | 230–233 | 230–233 |
| zone 3: | 268 | 271 | 274 | 272 | 272 | 272 | 250–266 | 250–266 |
| zone 4: | 280 | 280 | 280 | 280 | 280 | 280 | 250 | 250 |
| die: | 271 | 276 | 272 | 267 | 258 | 273 | 250–272 | 250–272 |
| speed, rpm: | 87 | 87 | 87 | 88 | 88 | 88 | 50 | 50 |
| pressure, psi: | 950–1100 | 1700–2300 | 700–2200 | | 450–670 | 950–1130 | 280 | 220 |
| torque, m-gm: | 5300–6200 | 6200–7400 | 5300–7300 | 2300–3500 | 3850–4300 | 3500–3800 | 1500 | 2500 |

The extrudate exiting the die was in the form of strands having a diameter of ⅛ inch, and were quickly passed into a water bath to quench and cool the strands. The strands were subsequently pelletized to form a feed stock useful for injection molding. A portion of the pellets of selected compositions were used to determine the physical properties thereof. The reduced viscosity was determined in m-cresol according to conventional techniques at 25 deg. C; the melt index was determined using the protocol of ASTM D-1238, the percent insolubles was determined by filtering the dissolved polymer through a screen and then drying and weighing the residue, and the formic acid viscosity ("FAV") was estimated using empirical techniques. The results are denoted on Table 2. Comparison of the results obtained from Example compositions as compared with Comparative Example compositions indicates that appreciable increases in the viscosity of the Example compositions without an concurrent increase in the percent insolubles suggests that the resultant experimental Examples had been linearly chain extended as opposed to grafted or crosslinked which would have manifested itself in a more dramatic increase in the percent insolubles.

TABLE 2

| Composition: | A | B | C | D | 1 | 2 | 3 |
|---|---|---|---|---|---|---|---|
| Reduced Viscosity in m-cresol: | 1.66 | 2.3 | 1.86 | 1.51 | 3.63 | 4.16 | 4.14 |
| Melt Index*: | 8.122 | 1.42 | 4.415 | | no flow | | |
| % Insolubles: | 0 | <1 | 0 | 0 | <1 | <1 | <1 |
| FAV**: | 60 | 75 | 140 | — | 265 | 350 | 345 |
| Composition: | 4 | 5 | 6 | 7 | 8 | 9 | 10 | 11 |
|---|---|---|---|---|---|---|---|---|
| Reduced Viscosity in m-cresol: | 3.71 | 4.53 | 3.82 | 2.7 | 3.09 | 3.28 | 2.55 | 2.31 |
| Melt Index*: | | no flow | | | 0.403 | | | |
| % Insolubles: | <1 | <1 | <1 | <1 | <1 | <1 | <1 | <1 |
| FAV**: | 290 | 390 | 300 | 170 | 215 | 245 | | |

*Melt Index of 1000 g sample at 235 deg. C.
**FAV is formic acid viscosity

It will be appreciated that the instant specifications and examples set forth herein are by way of illustration and not limitation, and that various modifications and changes may be made without departing from the spirit and scope of the present invention; the limitations of the use of the invention are imposed only by the appendant claims.

We claim:

1. A composition comprising:
   a polyamide; and
   a lactamyl phosphite in an amount of from about 1 to about 10 parts by weight relative to 100 parts by weight of the polyamide.

2. A composition according to claim 1 wherein the polyester is selected from the group consisting of polycaprolactam, the polyester of n-dodecanedioic acid and hexamethylenediamine and polyhexamethyleneadipamide.

3. A composition according to claim 1 comprising wherein the lactamyl phosphite is a phosphoroustrislactam.

4. A composition according to claim 1 which further includes an optional constituent selected from the group consisting of glass fibers, mineral fibers, impact modifiers, dyes, colorants, pigments, plasticizers, mold release agents, fire retardants, drip retardants, antioxidants, UV stabilizing agents, mold release agents, colorants, antistatic agents, nucleating agents and thermal stabilizing agents.

5. A composition according to claim 2 wherein said lactamyl phosphite is a phosphorous trislactam.

6. A composition according to claim 5 wherein said polyamide is polycaprolactam.

7. A composition according to claim 1 where said amount is from about 1 to about 3 parts.

8. A composition according to claim 6 wherein said amount is from about 1 to about 3 parts.

9. A process for producing chain extended polyamide compositions comprising the process step of:
   reacting one or more lactamyl phosphites with one or more polyamides, wherein the amount of said phosphites is from about 1 to about 10 parts by weight relative to 100 parts of phosphites and polyamides reacted.

10. The process according to claim 9 wherein the one or more lactamyl phosphites are one or more phosphoroustrislactams.

11. A process according to claim 9 wherein the polyamide is selected from the group consisting of polycaprolactam, the polyamide of n-dodecanedioic acid and hexamethylenediamine and polyhexamethyleneadipamide.

12. A process according to claim 11 wherein said polyamide is nylon 6.

13. A process according to claim 12 wherein the lactamyl phosphite is a phosphoroustrislactam.

14. A process according to claim 9 wherein said amount is from about 1 to about 3 parts.

15. A process according to claim 13 wherein said amount is from about 1 to about 3 parts.

* * * * *

UNITED STATES PATENT AND TRADEMARK OFFICE
CERTIFICATE OF CORRECTION

PATENT NO. : 5,357,030

DATED : October 18, 1994

INVENTOR(S) : VanBuskirk, et al.

It is certified that error appears in the above-identified patent and that said Letters Patent is hereby corrected as shown below:

Column 9, line 43: Change "polyester" to --polyamide--.

Column 9, line 44: Change "polyester" to --polyamide--.

Signed and Sealed this

Eighth Day of October, 1996

Attest:

BRUCE LEHMAN

Attesting Officer     Commissioner of Patents and Trademarks